(12) United States Patent
Rogers et al.

(10) Patent No.: US 10,261,784 B1
(45) Date of Patent: Apr. 16, 2019

(54) DETECTING COPIED COMPUTER CODE USING CRYPTOGRAPHICALLY HASHED OVERLAPPING SHINGLES

(71) Applicant: TERBIUM LABS, INC., Baltimore, MD (US)

(72) Inventors: Daniel J. Rogers, Astoria, NY (US); Dionysus Blazakis, Parkville, MD (US)

(73) Assignee: TERBIUM LABS, INC., Baltimore, MD (US)

( * ) Notice: Subject to any disclaimer, the term of this patent is extended or adjusted under 35 U.S.C. 154(b) by 0 days.

(21) Appl. No.: 16/013,161

(22) Filed: Jun. 20, 2018

(51) Int. Cl.
*G06F 8/75* (2018.01)
*H04L 9/06* (2006.01)
*G06F 16/33* (2019.01)
*G06F 16/901* (2019.01)

(52) U.S. Cl.
CPC .............. *G06F 8/751* (2013.01); *G06F 16/33* (2019.01); *G06F 16/9014* (2019.01); *H04L 9/0643* (2013.01)

(58) Field of Classification Search
CPC ............... G06F 8/751; G06F 17/30949; G06F 17/30634; H04L 9/0643
See application file for complete search history.

(56) References Cited

U.S. PATENT DOCUMENTS

| 5,694,594 | A | 12/1997 | Chang |
| 6,185,553 | B1 | 2/2001 | Byrd et al. |
| 7,098,815 | B1 | 8/2006 | Samuels et al. |
| 8,015,162 | B2* | 9/2011 | Henzinger ............ G06F 16/958 707/692 |
| 8,099,415 | B2 | 1/2012 | Luo et al. |
| 8,527,516 | B1 | 9/2013 | Spasojevic et al. |
| 8,977,256 | B2 | 3/2015 | Li et al. |
| 9,171,173 | B1 | 10/2015 | Rogers et al. |
| 9,218,466 | B2 | 12/2015 | Rogers et al. |
| 9,552,494 | B1 | 1/2017 | Rogers et al. |
| 2005/0086252 | A1* | 4/2005 | Jones ................... G06Q 10/107 |
| 2006/0184549 | A1* | 8/2006 | Rowney ............... G06Q 10/107 |
| 2007/0005594 | A1 | 1/2007 | Pinkas et al. |
| 2008/0034417 | A1* | 2/2008 | He ......................... H04L 67/02 726/15 |
| 2008/0222614 | A1* | 9/2008 | Chilimbi ............. G06F 11/3447 717/130 |
| 2010/0332481 | A1 | 12/2010 | Rowney |
| 2012/0016884 | A1 | 1/2012 | Rowney et al. |

(Continued)

OTHER PUBLICATIONS

Agarwal et al., "A state of art on source code plagiarism detection," 2016 2nd International Conference on Next Generation Computing Technologies (NGCT) Year: 2016.*

(Continued)

*Primary Examiner* — Roderick Tolentino
(74) *Attorney, Agent, or Firm* — Patent Portfolio Builders PLLC (57) ABSTRACT

Systems and methods of detecting copying of code or portions of code involve disassembling a set of compiled code into an architecture-agnostic intermediate representation. The intermediate representation is used to form a number of cryptographically hashed overlapping shingles. The number of cryptographically hashed overlapping shingles can be searched against a database of cryptographically hashed overlapping shingles to identify copied code.

18 Claims, 7 Drawing Sheets

(56) References Cited

U.S. PATENT DOCUMENTS

| | | | | |
|---|---|---|---|---|
| 2013/0167241 | A1* | 6/2013 | Siman | G06F 8/433 726/25 |
| 2013/0326625 | A1* | 12/2013 | Anderson | G06F 21/56 726/23 |
| 2014/0245443 | A1 | 8/2014 | Chakraborty | |
| 2015/0033120 | A1* | 1/2015 | Cooke | G06F 17/2217 715/271 |
| 2015/0356294 | A1* | 12/2015 | Tan | G06F 8/427 726/22 |
| 2018/0143814 | A1* | 5/2018 | Bucuvalas | G06F 8/443 |

OTHER PUBLICATIONS

Alzahrani et al., "Understanding Plagiarism Linguistic Patterns, Textual Features, and Detection Methods," IEEE Transactions on Systems, Man, and Cybernetics, Part C (Applications and Reviews) Year: 2012, vol. 42, Issue: 2.*

Bellovin et al., "Privacy-Enhanced Searches Using Encrypted Bloom Filters," Columbia University, Technical Report CUCS-034-07, Sep. 2007.

De Cristofaro et al., "Practical Private Set Intersection Protocols with Linear Computational and Bandwidth Complexity," University of California, Irvine, 2010.

Dong et al., "When Private Set Intersection Meets Big Data: An Efficient and Scalable Protocol," Proceedings of the 2013 ACM SIGSAC Conference on Computer & Communications Security, Nov. 4-8, 2013, Berlin, DE.

Freedman et al., "Efficient Private Matching and Set Intersection," Advances in Cryptology, 2004, EUROCRYPT, May 2-6, 2004, Interlaken, CH.

Gentry, "A Fully Homomorphic Encryption Scheme," A dissertation submitted to the Department of Computer Science and the Committee on Graduate Studies of Stanford University in partial fulfillment of the requirements for the Degree of Doctor of Philosophy, Sep. 2009.

Goh, "Secure Indexes," Stanford University, May 5, 2004.

Jarecki et al., "Efficient Oblivious Pseudorandom Function with Applications to Adaptive OT and Secure Computation of Set Intersection," Proceedings of the 6th Theory of Cryptography Conference on Theory of Cryptography, Mar. 15-17, 2009, San Francisco, CA, US.

Kerschbaum, "Outsourced Private Set Intersection Using Homomorphic Encryption," ASIACCS '12, May 2-4, 2012, Seoul, KR.

Kissner et al., "Privacy-Preserving Set Operations," Carnegie Mellon University Research Showcase @ CMU, Department of Electrical and Computer Engineering, Carnegie Institute of Technology, Feb. 2005.

Klimt et al., "Introducing the Enron Corpus," First Conference on Email and Anti-Spam, CEAS 2004, Jul. 30-31, 2004, Mountain View, CA, US.

Kornblum, "Identifying almost identical files using context triggered piecewise hashing," Digital Investigation, Sep. 2006, pp. S91-S97, vol. 3S.

Manning et al., "An Introduction to Information Retrieval," Apr. 1, 2009, Cambridge University Press, Cambridge, UK.

Ogata et al., "Oblivious keyword search," Journal of Complexity, Apr.-May 2004, pp. 356-371, vol. 20, Nos. 2-3.

Ostrovsky et al., "Private Searching on Streaming Data," CRYPTO 2005, Sep. 2, 2005.

Percival, "Stronger Key Derivation via Sequential Memory-Hard Functions," BSDCan 2009, May 8-9, 2009, Ottawa, CA.

Provos et al., "A Future-Adaptable Password Scheme," Proceedings of the FREENIX Track: 1999 USENIX Annual Technical Conference, Jun. 6-11, 1999, Monterey, CA, US.

Rabin, "How to Exchange Secrets with Oblivious Transfer," Technical Report TR-81, Aiken Computation Lab, Harvard University, May 20, 1981.

Tridgell, "Efficient Algorithms for Sorting and Synchronization," A thesis submitted for the degree of Doctor of Philosophy at the Australian National University, Feb. 1999.

* cited by examiner

DETECTING COPIED COMPUTER CODE USING CRYPTOGRAPHICALLY HASHED OVERLAPPING SHINGLES

BACKGROUND OF THE INVENTION

Software theft has been, and continues to be, pervasive. Individuals and companies typically try various techniques to combat software theft, including requiring a unique software key to install software, requiring online activation of software, requiring an active online connection to use software, encryption of software, and the like. Although these techniques typically prevent casual users from installing unauthorized copies, the techniques can typically be overcome by sophisticated users.

Another way to combat software theft is to try to identify the source of the stolen software using watermarks. This involves applying unique watermarks to each copy of the software so that when a stolen piece of software is found, the watermark in the stolen software will corresponding to one of the unique watermarks in the authorized software. This requires modification of the computer code, which is undesirable. Further, this technique can be overcome by removing the watermark from the stolen software or removing the watermark from the authorized software so that all further copies do not contain the unique watermark.

Software is typically written in a particular source code language and then converted (i.e., compiled) into compiled code prior to distribution. The conversion into compiled code is typically hardware and/or software specific. For example, a set of source code can be converted into one set of compiled code for computers running Microsoft Windows and into another set of compiled code for computers running a LINUX-based operating system. In addition to allowing the execution of the code on particular hardware/software configurations, compiled code protects the source code from being available to the end users because the compiled code cannot easily be converted back to the original source code.

The conversion from source code into compiled code for a particular hardware/software configuration is performed using a compiler. A compiler can convert a set of source code into compiled code for different hardware/software configurations or different compilers can be used to convert a set of source code into compiled code for different hardware/software configurations. Regardless, two sets of compiled code based on the same source code will have the same general functionality. However, the actual instructions for achieving this functionality will be different for the two sets of compiled code. Accordingly, it is not possible to detect copied source code by comparing the source code to the compiled code. Similarly, detecting copied source code that has been compiled for different hardware/software configurations typically requires the source code to be compiled for each different hardware/software configuration and then compared.

Typical solutions for detecting copied source code are resource intensive (i.e., requiring a lot of processing and memory resources), and thus these solutions are typically implemented for pairwise comparisons (i.e., one set of compiled code with another set of compiled code). The pairwise comparisons typically involve structural or syntactical representations of compiled code, which can fail to detect embedded code that has been copied and pasted because these changes to the source code result in larger structural changes to the final compiled code.

Typical solutions for comparing a set of compiled code against a number of different sets of compiled code rely on heuristics to reduce the number of candidate sets for consideration and then rely upon a pairwise comparison across the candidate sets. If the heuristics are not properly designed, the use of heuristics to reduce the number of sets of compiled code for comparison can result in omission of sets of compiled code that actually contain copied code. Further, this approach has failed to scale as the number of different sets of compiled code for comparison increases.

SUMMARY OF THE INVENTION

One technique for detecting copied computer code is disclosed in U.S. Pat. Nos. 8,997,256 and 9,218,466. This technique involves calculating various characteristics for each function in a particular set of computer code and then generating a binary fingerprint from the characteristics of each function in the set of computer code. This technique provides a very robust way to identify whether two sets of compiled code contain sufficiently similar code.

There are certain situations, however, in which the overall similarity of two sets of code is insufficient, including open source compliance, third-party security audits, and intellectual property (IP) theft monitoring. These situations often focus on whether any portion of the code, including relatively small portions of the overall code, has been copied. Although the techniques in the aforementioned patents can also identify when portions of code have been copied, the techniques rely on generating the fingerprint from entire sets of code, and thus rely upon the robustness of both the fingerprinting technique and the technique for comparing with other sets of code in order to identify whether a portion of the entire set of code has been copied. This robustness requires relatively complex techniques for generating fingerprints and comparison with other sets of codes, which in turn increases the overall processing load required to generate the fingerprints and perform the comparison with other sets of code.

Furthermore, the techniques in the afore-mentioned patents can be considered to be brittle when portions of the code have been copied because the copied code can result in larger structural changes to the final compiled code, which can increase the likelihood of a false negative, i.e., an indication that there is no copied code when in fact a portion of the code is present in another set of code. Most significantly, the techniques in the afore-mentioned patents are intended to work on large, complex functions, which limits the use cases of these techniques.

Accordingly, it has been recognized that there is a need for more efficient techniques for identifying copied code requiring less processing power for the fingerprinting and comparison, as well as one that is more accurate and that is less likely to produce false negatives when copied code causes changes to the structure of the code into which it has been copied. Further, it has been recognized that there is a need for identifying copied code that can operate on smaller portions of code instead of large, complex functions.

Exemplary embodiments of the present invention are directed to techniques for identifying copied code, which can be used for open source compliance, third party security audits, IP theft monitoring, etc. In accordance with exemplary embodiments of the present invention, a set of compiled code is disassembled into an architecture-agnostic intermediate representation. The intermediate representation is used to form a number of cryptographically hashed overlapping shingles. The number of cryptographically hashed overlapping shingles can be searched against a database of cryptographically hashed overlapping shingles to identify copied code.

The generation of cryptographically hashed overlapping shingles from an architecture-agnostic intermediate representation provides a significant technical advantage over prior solutions, including the ability to compare the shingles against a database of shingles for a large number of sets of computer code without requiring complex search and comparison techniques. As discussed above, typical techniques are unable to scale to handle searches against large sets of computer code, and thus typically rely upon a pairwise comparison. In contrast, generating cryptographically hashed overlapping shingles from an architecture-agnostic intermediate representation, as disclosed, allows the use any type of plain text search engine for search and comparison, which significantly reduces the processor and memory resources to identify copied code. Moreover, the disclosed embodiments operate based on compiled code, which protects the underlying source code, which is often considered to be a trade secret by the owner of the code, i.e., the owner of the code is willing to distribute compiled code but not the underlying source code from which the compiled code is generated.

According to one embodiment, there is a method for detecting copied computer code. A processor disassembles a set of compiled code into an architecture-agnostic intermediate representation. The processor generates a control flow graph from the architecture-agnostic intermediate representation. The processor generates a plurality of cryptographically hashed overlapping shingles using the control flow graph by dividing each path in the control flow graph into a plurality of segments. Each of the plurality of segments contains a number of common instructions with an adjacent one of the plurality of segments. The number of common instructions corresponds to an overlap of the shingles. The plurality of segments are cryptographically hashed to form the plurality of cryptographically hashed overlapping shingles. The processor compares the plurality of cryptographically hashed shingles with a database of cryptographically hashed shingles. The processor identifies that at least one of the selected cryptographically hashed shingle has been copied from other computer code responsive to the at least one cryptographically hashed shingle matching at least one cryptographically hashed shingle in the database of cryptographically hashed shingles.

According to another embodiment, there is a method for detecting copied computer code. A processor disassembles a set of compiled code into an architecture-agnostic intermediate representation. The processor generates a plurality of cryptographically hashed overlapping shingles from the architecture-agnostic intermediate representation. The processor selects at least one cryptographically hashed overlapping shingle from the plurality of cryptographically hashed overlapping shingles. The processor compares the selected at least one cryptographically hashed shingle with a database of cryptographically hashed shingles. The processor identifies that the selected cryptographically hashed shingle has been copied from other computer code responsive to the at least one cryptographically hashed shingle matching at least one cryptographically hashed shingle in the database of cryptographically hashed shingles.

Other embodiments involve systems including a processor and a memory storing program instructions, which when executed by the processor, cause the processor to perform the methods described above.

DETAILED DESCRIPTION OF THE DRAWINGS

Figure 1:
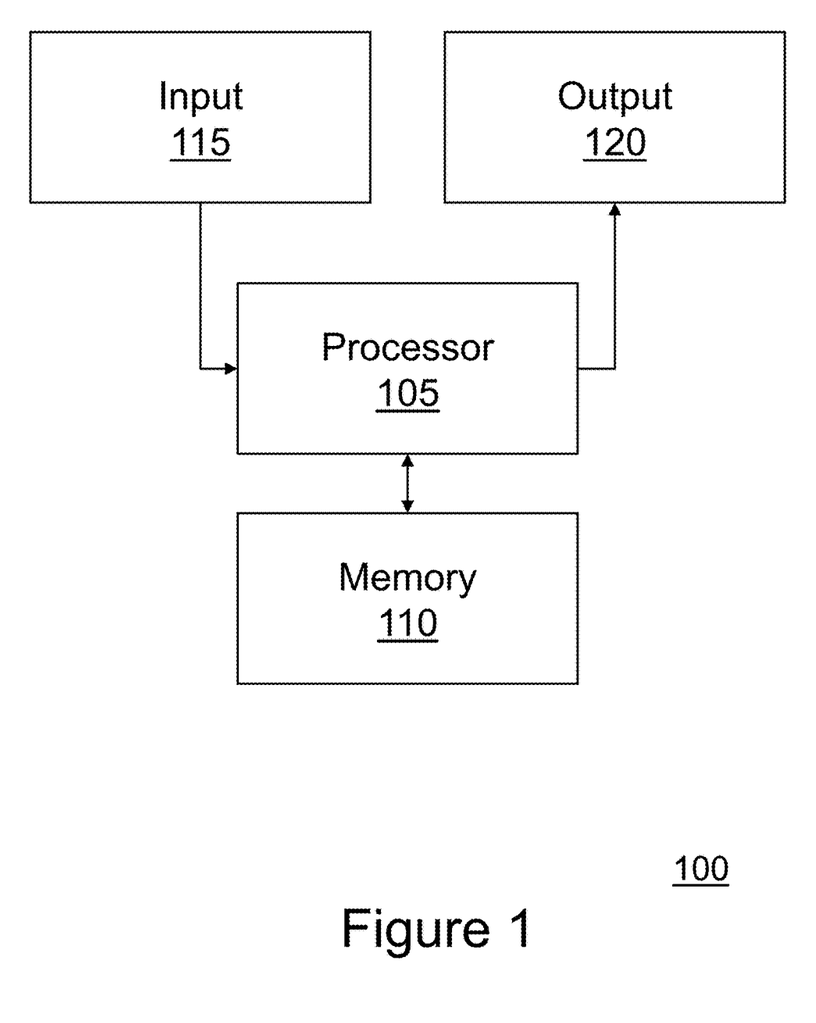
FIG. 1 is a block diagram of an exemplary system for detecting copied computer code in accordance with embodiments of the present invention.

FIG. 1 is a block diagram of an exemplary system for generating and matching cryptographically hashed overlapping shingles in accordance with the present invention. The system 100 can comprise one or more computers that include a processor 105 coupled to memory 110, input 115, and output 120. The disclosed processes can be performed by processor 105 executing computer code, program instructions, etc., which are stored in memory 110. The processor 105 can be any type of processor, including a microprocessor, field programmable gate array (FPGA), and/or an application specific integrated circuit (ASIC). Memory 110 can be any type of non-transitory memory. In addition to storing computer code for executing the methods described herein, memory 110 can also store the generated cryptographically hashed overlapping shingles. Alternatively, or additionally, a separate storage medium can store the generated cryptographically hashed overlapping shingles. For example, the compiled computer binaries and cryptographically hashed overlapping shingles, can be stored in a distributed file system and non-relational, distributed database. Input 115 provides mechanisms for controlling the disclosed processes, including, for example, a keyboard, mouse, trackball, trackpad, touchscreen, etc. Further, input 115 can include a connection to an external storage device for providing compiled computer binaries, such as an external hard drive or flash storage memory, as well as a network connection. Output 120 can include a display, printer, and/or the like. Additionally, output 120 can include a network connection for notifying an owner of a compiled computer binary of any identified potential infringement, such as by electronic mail, posting on a website or webpage, a text message, and/or the like.

Figure 2:
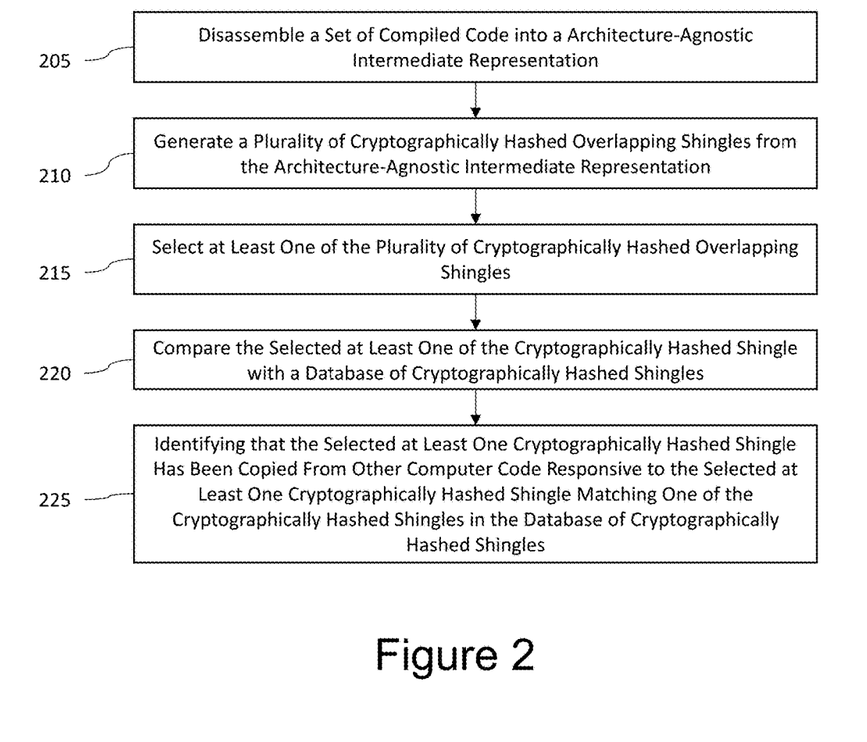
FIG. 2 is a flow diagram of an exemplary method for generating hashed shingles in accordance with embodiments of the present invention.

Turning now to FIG. 2, initially, processor 105 disassembles a set of compiled code into an architecture-agnostic intermediate representation based on instructions loaded from memory 110 (step 205). For ease of explanation, the remainder of the discussion will focus on the operation of processor 105 without reference to the fact that the processor is operating based on instructions loaded from memory 110.

Processor 105 generates a plurality of cryptographically hashed overlapping shingles from the architecture-agnostic intermediate representation (step 210). Processor 105 selects at least one of the plurality of cryptographically hashed shingles (step 215) and compares the selected at least one cryptographically hashed shingle with a database of cryptographically hashed shingles (step 220). Processor 105 identifies that the selected at least one cryptographically hashed shingle has been copied from other computer code responsive to the selected cryptographically hashed shingle matching one of the cryptographically hashed shingles in the database of cryptographically hashed shingles (step 225).

Figure 3:
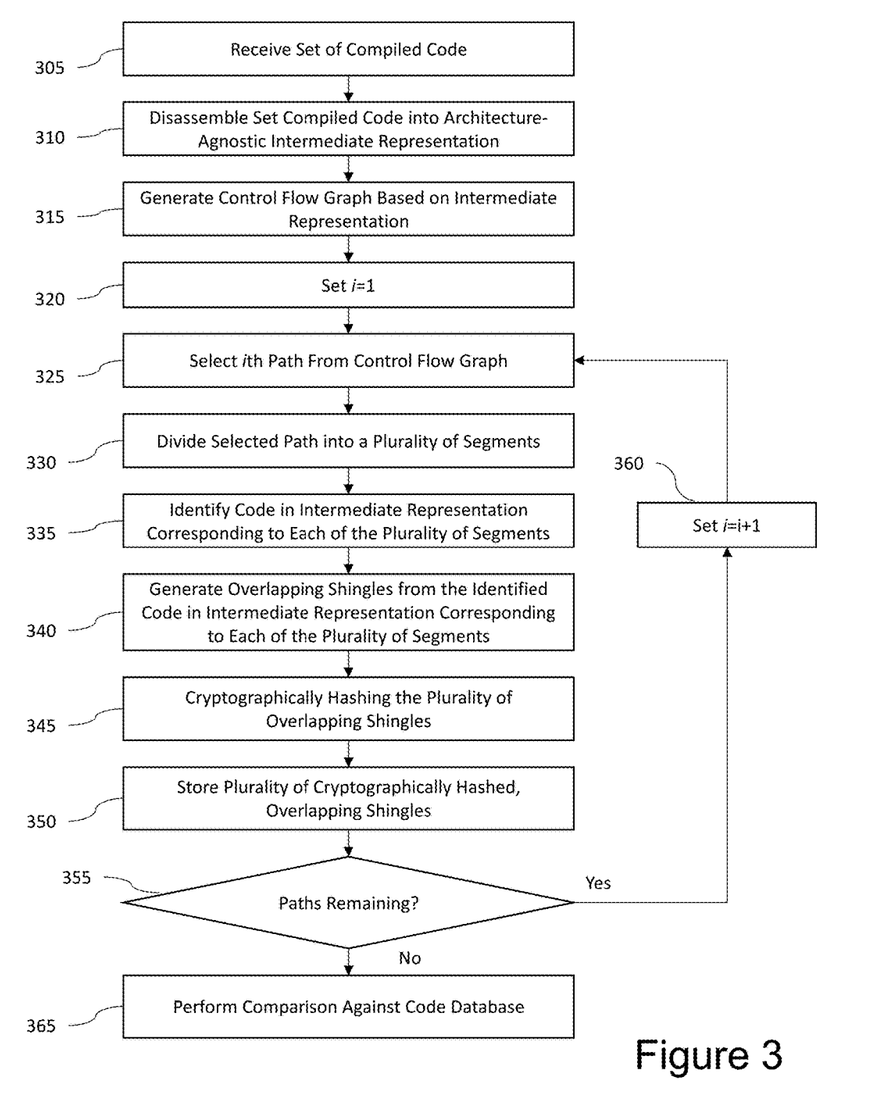
FIG. 3 is a flow diagram of an exemplary method for generating hashed shingles in accordance with embodiments of the present invention.

Additional details of the method of FIG. 2 will now be described in connection with FIGS. 3-8. Referring first to FIG. 3, processor 105 receives a set of compiled code, for example via input 115, and disassembles the set of compiled code into an architecture-agnostic intermediate representation (steps 305 and 310). It will be recognized that there are many different architecture-agnostic intermediate representations, any of which can be employed with the present invention. Processor 105 then generates a control flow graph based on the intermediate representation (step 315). This involves first generating a call graph and then generating a control flow graph for each sub-routine in the call graph.

Figure 4:
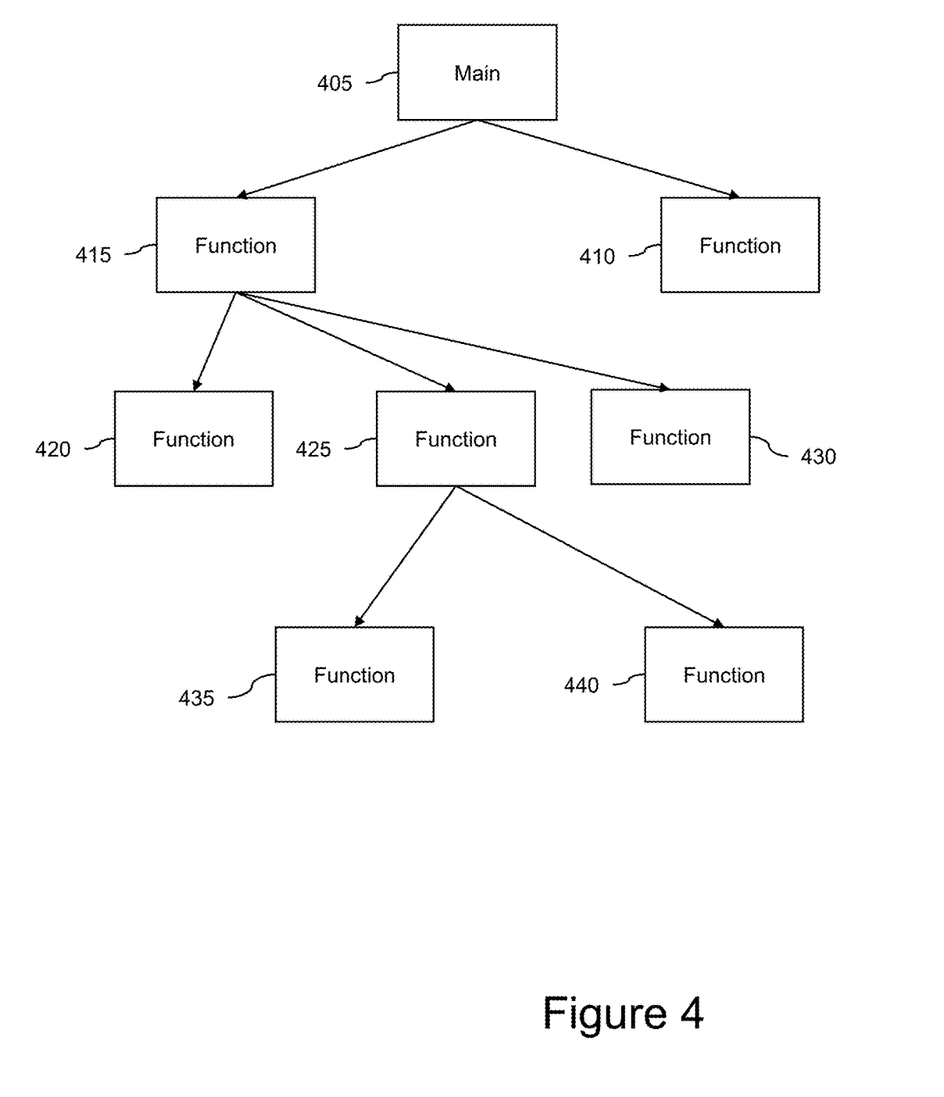
FIG. 4 is a block diagram of an exemplary call graph in accordance with the present invention.

FIG. 4 is a block diagram of an exemplary call graph in accordance with the present invention. As will be appreciated by those skilled in the art, a call graph describes the relationship between various functions in a compiled binary. Thus, in FIG. 4, a main function 405 (also commonly referred to as a routine) has calls to sub-functions 410 and 415 (also commonly referred to as sub-routines or functions). In turn, function 415 has calls to functions 420, 425, and 430, and function 425 has calls to functions 435 and 440. It will be recognized that the call graph of FIG. 4 is a highly simplified graph and that compiled computer binaries typically will be disassembled into much more extensive call graphs.

Figure 5:
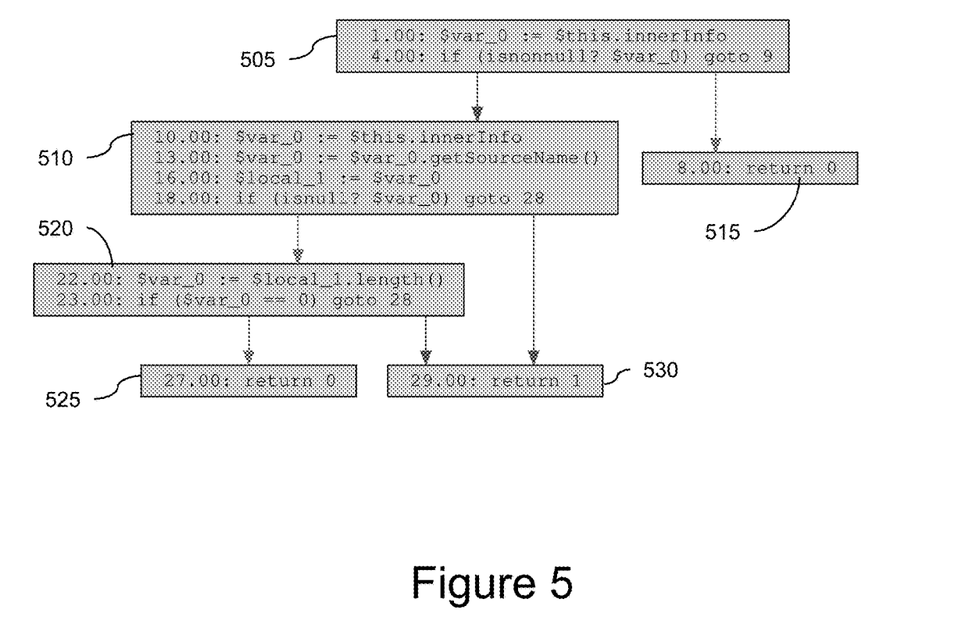
FIG. 5 is a block diagram of an exemplary control flow graph in accordance with embodiments of the present invention.

FIG. 5 is a block diagram of an exemplary control flow graph in accordance with the present invention. Those skilled in the art will recognize that a control flow graph for a function describes all possible paths that may be traversed during execution of the particular function. Examples of paths that may be executed in the function of FIG. 5 include blocks 505 and 515; blocks 505, 510, 520, and 525; and blocks 505, 510, 520, and 530. Further, it should be recognized that this is merely an exemplary function and that other functions are within the scope of the invention.

Returning to FIG. 3, processor 105 sets a variable i equal to 1 (step 320) and selects the ith path from the control flow graph (step 325). In the example of FIG. 5, this can be the path that includes blocks 505 and 515, the path that includes blocks 505, 510, 520, and 525, or the path that includes 505, 510, 520, and 530. The processor divides the selected path into a plurality of segments (step 330). The plurality of segments have the same size, which corresponds to the desired shingle length. Each of the plurality of segments includes a number of instructions in common with an adjacent one of the plurality of segments. The number of common instructions corresponds to the shingle overlap. It has been recognized that a shingle length of at least five instructions and fewer than, or equal to, ten instructions provides an ideal balance between capturing the necessary aspects of a function for purposes of detecting copying versus the processing and memory load required to search and compare shingles.

Processor 105 identifies code in the intermediate representation corresponding to each of the plurality of segments (step 335) and generates overlapping shingles from the identified code in the intermediate representation corresponding to each of the plurality of segments (step 340). The overlap allows for instructions to be part of two adjacent shingles. For example, referring again to the control flow graph in FIG. 5, assuming a shingle length of five instructions and an overlap of two instructions would result in the following shingles being generated for all of the paths in the control flow graph:

| Shingle Number | Instructions in Shingle |
| --- | --- |
| 1 | 1.00, 4.00, 10.00, 13.00, 16.00 |
| 2 | No Shingle |
| 3 | 10.00, 13.00, 16.00, 18.00, 22.00 |
| 4 | 16.00, 18.00, 22.00, 23.00, 27.00 |
| 5 | 16.00, 18.00, 22.00, 23.00, 29.00 |

As noted in the table above in connection with Shingle Number 2, no shingle is created when a path contains fewer instructions than the shingle length. Because the shingle length is selected so that each shingle represents a minimum number of instructions that is indicative of copying, a path containing fewer instructions than the shingle length will, in most instance, not contain enough instructions to provide an indication of copying. Accordingly, not producing shingles for paths having fewer instructions than the shingle length does not appreciably affect the ability of the disclosed techniques to detect copied code.

Processor 105 then cryptographically hashes the generated overlapping shingles (step 345) and stores them in memory 110 (step 350). Processor 105 then determines whether there are any paths remaining (step 355). If so ("Yes" path out of decision step 355), processor increments i by one (step 360) and then performs the path selection, division, shingle generation, and hashing for the newly selected path (steps 325-350). When there are no paths remaining to be processed ("No" path out of decision step 355), the received set of compiled code has been converted into a plurality of cryptographically hashed overlapping shingles that can then be compared against cryptographically hashed overlapping shingles stored in a database (step 365). The database can be stored, for example, in memory 110 or can be remotely located and accessed via input 115 and output 120.

Figure 6:
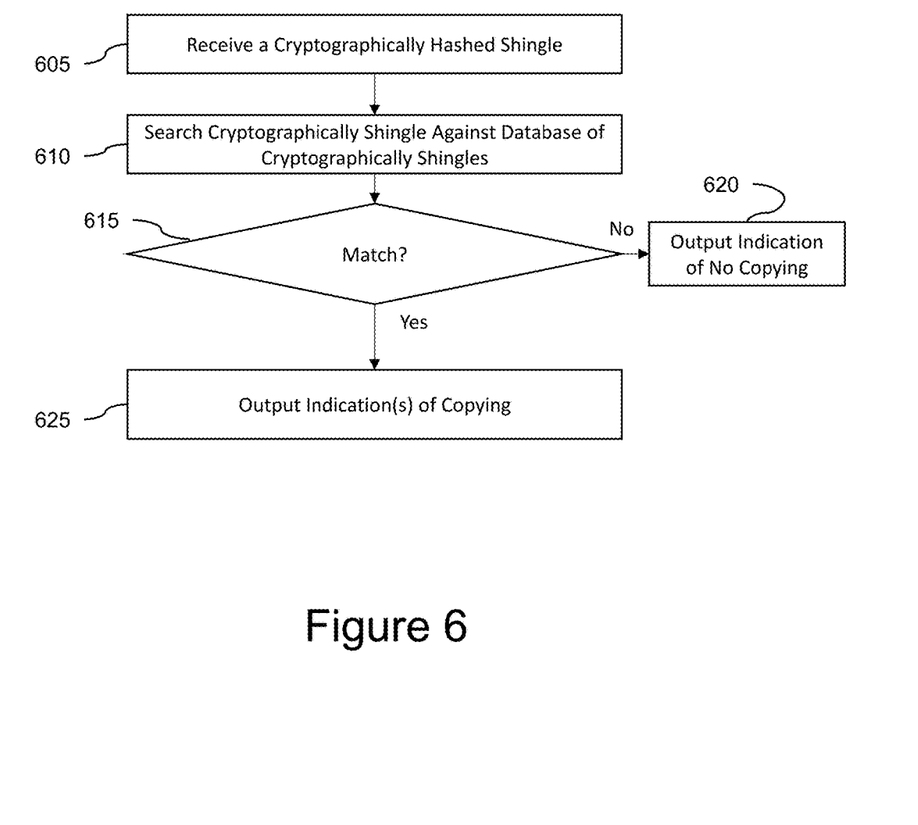
FIG. 6 is a flow diagram of an exemplary method for identifying copied code in accordance with embodiments of the present invention.

FIG. 6 is a flowchart of a method of determining whether a single cryptographically hashed shingle has been copied from other code. Initially, processor 105 receives a cryptographically hashed shingle (step 605) and searches it against a database of cryptographically hashed shingles (step 610). The received cryptographically hashed shingle and the cryptographically hashed shingles in the database have a same shingle length (in terms of number of program instructions), same shingle overlap between adjacent shingles, and are cryptographically hashed using the same cryptographic hashing technique. Accordingly, the received cryptographically hashed shingle and the cryptographically hashed shingles in the database can be considered as simple text representations of the underlying code that can be searched using any type of text search engine that can identify exact matches between the text strings. It will be recognized, however, that due to the cryptographic hashing, the "text" of each cryptographically hashed overlapping shingle will appear to a person as nothing more than a random string of characters. One non-limiting example is the Elasticsearch engine from Elastic. The ability to identify copied code using a simple text search engine allows the identification of copied code from a large number of sets of compiled code with little impact on processing and memory resources, whereas typical techniques for identifying copied code relied upon pairwise comparisons or pairwise comparisons of sets of code selected using processor and memory intensive heuristic techniques.

Figure 7:
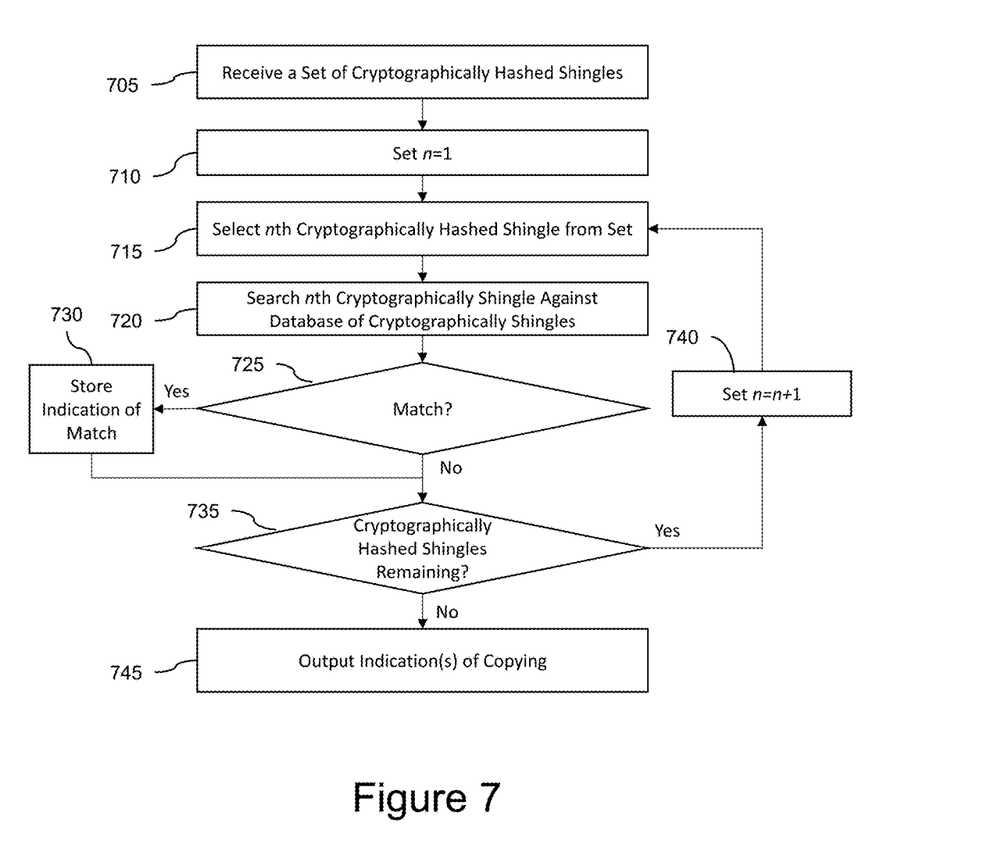
FIG. 7 is a flow diagram of an exemplary method for identifying copied code in accordance with embodiments of the present invention.

Although a single cryptographically hashed shingle can be searched in order to determine whether it contains copied code, a more useful implementation is to search a set of cryptographically hashed shingles from a set of source code, an example of which is illustrated in FIG. 8. Initially, processor 105 receives a set of cryptographically hashed shingles (step 705) and sets a counter n equal to 1 (step 710). Processor 105 then selects the nth cryptographically hashed shingle from the set of cryptographically hashed shingles (step 715) and searches the selected cryptographically hashed shingle against a database of cryptographically hashed shingles (step 720). If a match is found ("Yes" path out of decision step 725), then an indication of the match is stored in memory 110 (step 730). After the indication of the match is stored (step 730) or if there was no match for the selected cryptographically hashed shingle ("No" path out of decision step 725), then processor 105 determines whether there are any remaining cryptographically hashed shingles in the set to be searched (step 735). If there are cryptographically hashed shingles remaining to be searched ("Yes" path out of decision step 735), processor 105 increments the value of the counter n by one (step 740) and then selects the next cryptographically hashed shingle and searches it for a match (steps 715-725). When there are no remaining cryptographically hashed shingles in the set to be searched ("No" path out of decision step 735), then processor 105 outputs any indication of matches, for example via output 120, (step 745).

It is noted that U.S. Pat. Nos. 9,171,173 and 9,552,494 disclose techniques for detecting copied information using overlapping cryptographically hashed shingles. The techniques disclosed in these patents significantly differ from those disclosed herein. Specifically, those patents address copied human-readable information, whereas the present disclosure is directed to computer code. Accordingly, in those techniques there is a desire to provide protection to either the information being search against or the information used as the query for the search because the information itself is sensitive information, such as dates of birth, Social Security Numbers, credit card numbers, etc. Because the present disclosure operates using compiled code instead of source code, there is no need to provide protection for either the code being searched against or the code used as the query for the search. Thus, those patents disclose using different shingle overlaps between the information being searched against and the information used as the query of the search so that the protected information is not revealed. Moreover, the information used as the source for creating the shingles is human-readable text, and thus is easily convertible into a form for comparison with other shingles created from human-readable text. In contrast, compiled code, by its very nature, is not human-readable and cannot easily compared with other complied code, particularly if the compiled code being compared were generated using different compilers. Further, the words of human-readable text have independent meaning regardless of context, whereas one instruction in compiled code has little meaning absent a larger context, which is why the disclosed techniques use a control flow graph to organize sets of instructions into an easily comparable shingle. Moreover, unlike the patents that shingle human-readable text, which is the actual source text, the original source code is often not available, and thus cannot be employed for the comparison.

Exemplary embodiments have been described above as generating cryptographically hashed shingles using compiled code, which can be computer source code, byte code, or any other type of code that can be executed by a processor to perform functions. It will be recognized that the term computer code is intended to cover any type of executable code regardless of whether it is executed or executable on a conventional computer, i.e., computer code includes code running on dedicated controllers, smart phones, tablets, personal computers, laptop computers, etc.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting copied computer code, the method comprising:
    disassembling, by a processor, a set of compiled code into an architecture-agnostic intermediate representation;
    generating, by the processor, a control flow graph from the architecture-agnostic intermediate representation;
    generating, by the processor, a plurality of cryptographically hashed overlapping shingles using the control flow graph by dividing each path in the control flow graph into a plurality of segments, wherein each of the plurality of segments contains a number of common instructions with an adjacent one of the plurality of segments, wherein the number of common instructions corresponds to an overlap of the shingles, and wherein the plurality of segments are cryptographically hashed to form the plurality of cryptographically hashed overlapping shingles;
    comparing, by the processor, the plurality of cryptographically hashed shingles with a database of cryptographically hashed shingles;
    identifying, by the processor, that at least one of the selected cryptographically hashed shingle has been copied from other computer code responsive to the at least one cryptographically hashed shingle matching at least one cryptographically hashed shingle in the database of cryptographically hashed shingles; and
    outputting an indication of the identification that the at least one of the selected cryptographically hashed shingle has been copied from the other computer code to an owner of the other computer code and
    wherein each of the plurality of cryptographically hashed shingles has common shingle length, and no shingle is created for a path in the control flow graph having fewer instructions than the common shingle length.

2. The method of claim 1, wherein the comparison of the plurality of cryptographically hashed shingle with a database of cryptographically hashed shingles comprises:
    performing a plain-text search using the plurality of cryptographically hashed shingle against the database of cryptographically hashed shingles.

3. The method of claim 1, further comprising:
    generating a call graph from the architecture-agnostic intermediate representation, wherein the control flow graph is generated from the call graph.

4. The method of claim 1, wherein the number of common instructions is greater than or equal to five and less than or equal to ten.

5. The method of claim 1, wherein cryptographically hashed overlapping shingles in the database are generated in a same manner as the plurality of cryptographically hashed overlapping shingles.

6. The method of claim 5, wherein a same shingle overlap is used for generating the plurality of cryptographically hashed overlapping shingles and cryptographically hashed overlapping shingles in the database.

7. A method of detecting copied computer code, the method comprising:
   disassembling, by a processor, a set of compiled code into an architecture-agnostic intermediate representation;
   generating, by the processor, a plurality of cryptographically hashed overlapping shingles from the architecture-agnostic intermediate representation, wherein the generation of the plurality of cryptographically hashed overlapping shingles comprises:
   generating a control flow graph from the architecture-agnostic intermediate representation; and
   generating the plurality of cryptographically hashed overlapping shingles using paths in the control flow graph;
   selecting, by the processor, at least one cryptographically hashed overlapping shingle from the plurality of cryptographically hashed overlapping shingles;
   comparing, by the processor, the selected at least one cryptographically hashed shingle with a database of cryptographically hashed shingles;
   identifying, by the processor, that the selected cryptographically hashed shingle has been copied from other computer code responsive to the at least one cryptographically hashed shingle matching at least one cryptographically hashed shingle in the database of cryptographically hashed shingles; and
   outputting an indication of the identification that the selected cryptographically hashed shingle has been copied from the other computer code to an owner of the other computer code and
   wherein each of the plurality of cryptographically hashed shingles has common shingle length, and no shingle is created for a path in the control flow graph having fewer instructions than the common shingle length.

8. The method of claim 7, wherein the comparison of the selected cryptographically hashed shingle with a database of cryptographically hashed shingles comprises:
   performing a plain-text search using the selected at least one cryptographically hashed shingle against the database of cryptographically hashed shingles.

9. The method of claim 7, wherein the generation of the plurality of cryptographically hashed overlapping shingles using paths in the control flow graph, comprises:
   selecting a path from the control flow graph;
   dividing the selected path into a plurality of segments;
   identifying code in the intermediate representation corresponding to each of the plurality of segments; and
   generating the plurality of cryptographically hashed overlapping shingles using the identified code in the intermediate representation.

10. The method of claim 9, wherein at least two segments of the plurality of segments includes x common instructions, wherein x is equal to a predetermined shingle overlap.

11. The method of claim 10, wherein x is greater than or equal to five common instructions and less than or equal to ten common instructions.

12. The method of claim 7, wherein cryptographically hashed overlapping shingles in the database are generated in a same manner as the plurality of cryptographically hashed overlapping shingles.

13. The method of claim 12, wherein a same shingle overlap is used for generating the plurality of cryptographically hashed overlapping shingles and cryptographically hashed overlapping shingles in the database.

14. A system, comprising: a processor; and
   a non-transitory memory storing program instructions, which when executed by the processor cause the processor to
   disassemble a set of compiled code into an architecture-agnostic intermediate representation;
   generate a plurality of cryptographically hashed overlapping shingles from the architecture-agnostic intermediate representation, wherein the generation of the plurality of cryptographically hashed overlapping shingles includes program instructions, which when executed by the processor, cause the processor to
   generate a control flow graph from the architecture-agnostic intermediate representation; and
   generate the plurality of cryptographically hashed overlapping shingles using paths in the control flow graph;
   select at least one cryptographically hashed overlapping shingle from the plurality of cryptographically hashed overlapping shingles;
   compare the selected at least one cryptographically hashed shingle with a database of cryptographically hashed shingles;
   identify that the selected cryptographically hashed shingle has been copied from other computer code responsive to the at least one cryptographically hashed shingle matching at least one cryptographically hashed shingle in the database of cryptographically hashed shingles; and
   output an indication of the identification that the selected cryptographically hashed shingle has been copied from the other computer code to an owner of the other computer code and
   wherein each of the plurality of cryptographically hashed shingles has common shingle length, and no shingle is created for a path in the control flow graph having fewer instructions than the common shingle length.

15. The system of claim 14, wherein the comparison of the selected cryptographically hashed shingle with a database of cryptographically hashed shingles includes program instructions, which when executed by the processor, cause the processor to:
   perform a plain-text search using the selected at least one cryptographically hashed shingle against the database of cryptographically hashed shingles.

16. The system of claim 14, wherein the generation of the plurality of cryptographically hashed overlapping shingles using paths in the control flow graph includes program instructions, which when executed by the processor, cause the processor to:
   select a path from the control flow graph;
   divide the selected path into a plurality of segments;
   identify code in the intermediate representation corresponding to each of the plurality of segments; and
   generate the plurality of cryptographically hashed overlapping shingles using the identified code in the intermediate representation.

17. The system of claim 16, wherein at least two segments of the plurality of segments includes x common instructions, wherein x is equal to a predetermined shingle overlap.

18. The system of claim 17, wherein x is greater than or equal to five common instructions and less than or equal to ten common instructions.

\* \* \* \* \*